Jan. 16, 1962   F. E. BUSCHBOM   3,017,043
UNLOADER
Filed May 2, 1958   5 Sheets-Sheet 1

INVENTOR.
FLOYD E. BUSCHBOM
BY
Moore, White & Burd
ATTORNEYS

Jan. 16, 1962 F. E. BUSCHBOM 3,017,043
UNLOADER
Filed May 2, 1958 5 Sheets-Sheet 2

INVENTOR.
FLOYD E. BUSCHBOM
BY Moore, White & Burd
ATTORNEYS

Jan. 16, 1962   F. E. BUSCHBOM   3,017,043
UNLOADER
Filed May 2, 1958   5 Sheets-Sheet 3

INVENTOR.
FLOYD E. BUSCHBOM
BY Moore, White & Burd
ATTORNEYS

Jan. 16, 1962　　　　F. E. BUSCHBOM　　　　3,017,043
UNLOADER
Filed May 2, 1958　　　　　　　　　　　　　　5 Sheets-Sheet 5
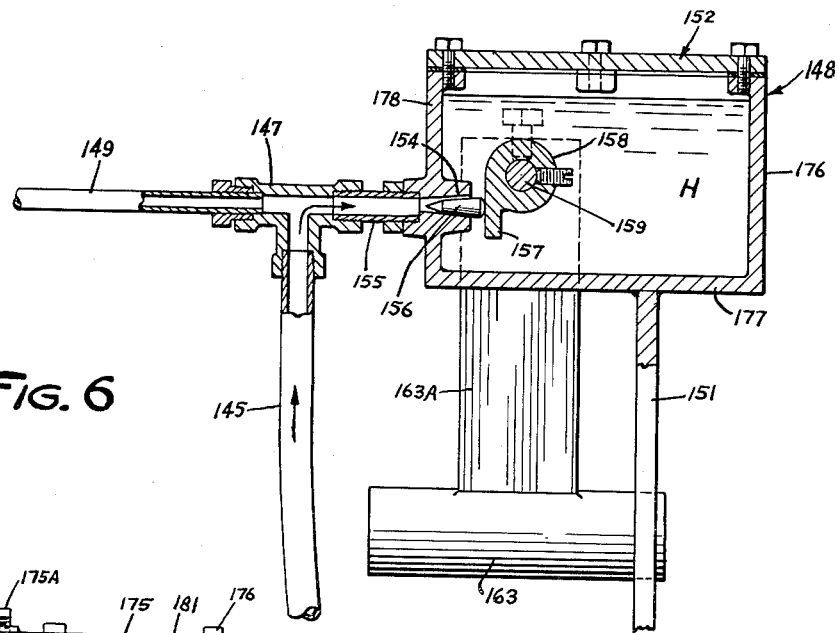
FIG. 6
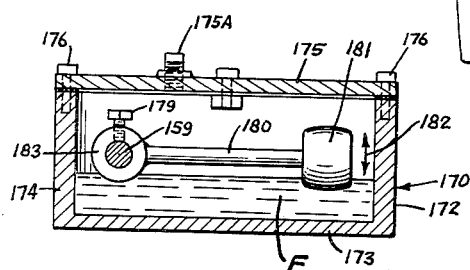
FIG. 9
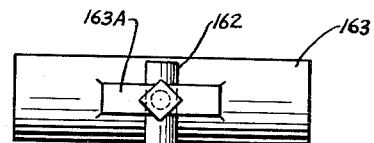
FIG. 7
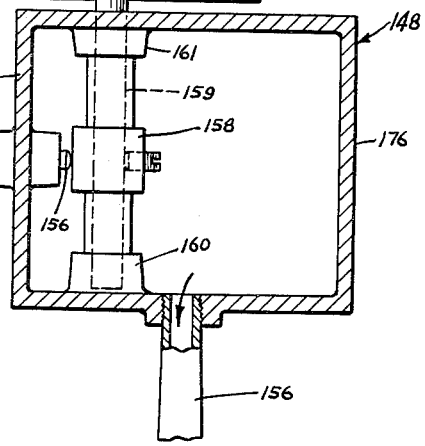
INVENTOR.
FLOYD E. BUSCHBOM
BY Moore, White & Beard
ATTORNEYS

United States Patent Office 3,017,043
Patented Jan. 16, 1962

3,017,043
UNLOADER
Floyd E. Buschbom, Albert Lea, Minn., assignor to Vandale Corporation, Long Lake, Minn., a corporation of Minnesota
Filed May 2, 1958, Ser. No. 732,735
14 Claims. (Cl. 214—17)

This invention relates to new and useful improvements in unloaders, particularly for silos, and especially to new and useful improvements in silo unloaders of the type disclosed in Patent No. 2,794,560. More particularly this invention relates to silo unloaders having several unique features and is an improvement of the subject matter of application Serial No. 452,862, filed August 30, 1954, now Patent No. 2,877,907, of which this application is a continuation-in-part.

In the utilization of silo unloaders of the type having a rotary ensilage collecting means for removing ensilage from the top of a mass and bringing the ensilage so removed to the center of the silo, means for receiving the ensilage so removed and for delivering the ensilage from the silo to provide an efficient unloader, various driving and levelling problems have remained. Although various remedies have been suggested, such as in Patent No. 2,671,696 none have provided satisfactory traction, unloading or levelling and each have tended to become "hung up" or stalled and to dig into the ensilage mass so that it will not function. The difficulty of unloading ensilage from a silo is perhaps best appreciated when it is considered that unloaders must unload ensilage frozen as hard as concrete and also as wet as to constitute "slop" under several inches of liquid.

It is therefore an object of this invention to provide new and useful drive features for a silo unloader.

It is a further object of this invention to provide new and useful levelling structure for a silo unloader.

Still a further object of this invention is to provide new and useful drive connections for connecting the motor of a silo unloader to the various drive elements.

Still a further object of this invention is to provide new and useful adjustable supporting means for a silo unloader.

It is a further object of this invention to provide a new and useful hydraulic levelling device for a silo unloader.

It is a further object of this invention to provide a new and useful hydraulic levelling device for a silo unloader operable by a sensing element to control the flow of oil through a valve to control a reciprocating pump operated by a rotary member.

Other and further objects of the invention reside in the specific constructional details of the invention, including the constructional details of the levelling mechanism; the support mechanism; the drive mechanism and the discharge mechanism.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings forming a part of the application in which corresponding numerals refer to the same parts and in which:

FIGURE 6 is a fragmentary vertical sectional view showing the fluid reservoir and hydraulic valve control;

FIGURE 7 is a fragmentary plan sectional view thereof;

FIGURE 9 is a vertical sectional view of a modified form of sensing means for hydraulic valve control.

Figure 1:
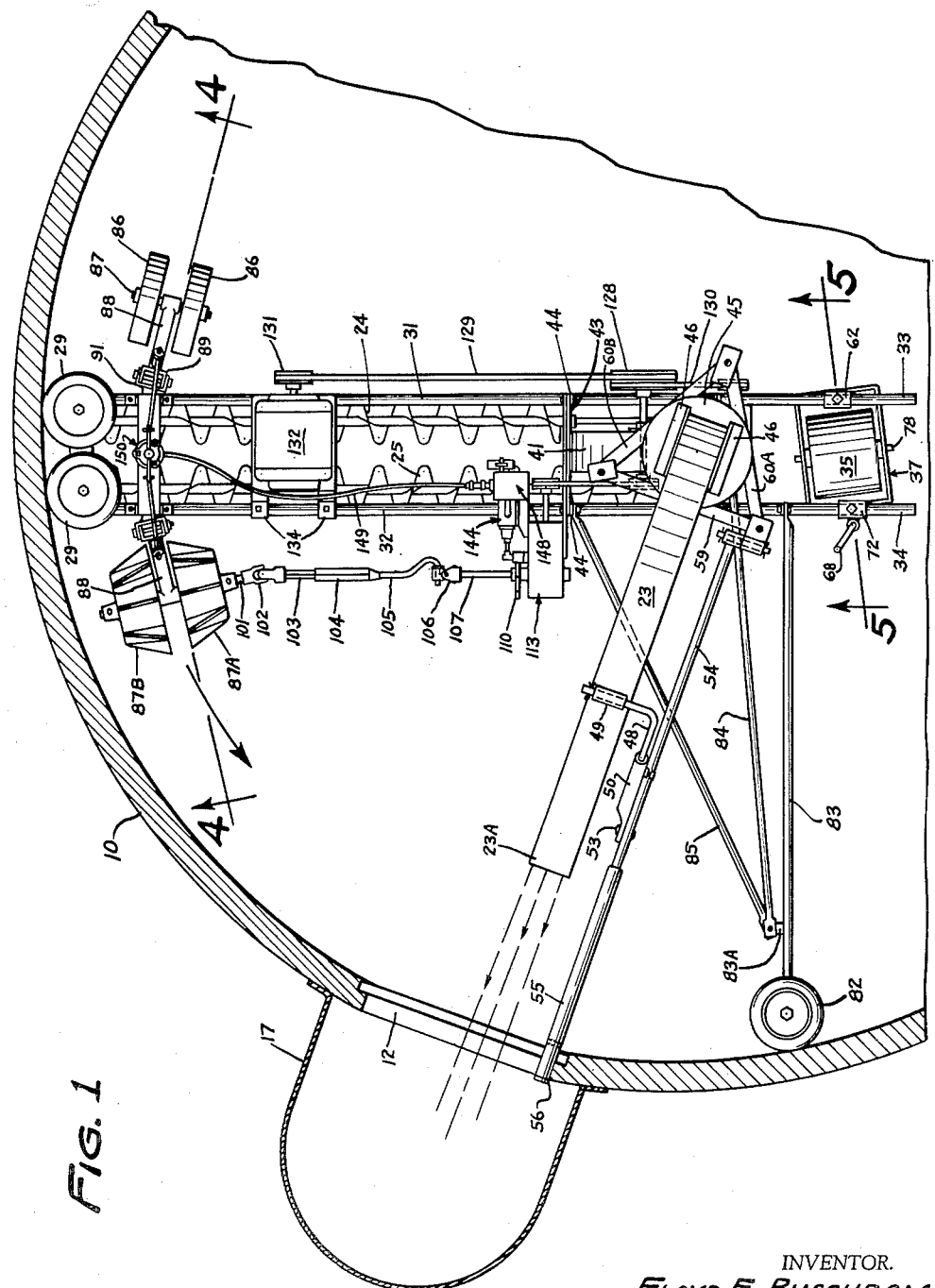
FIGURE 1 is a plan view of the structure of the instant invention in position within an upright silo (shown in fragmentary horizontal section) for unloading the same.
Figure 2:
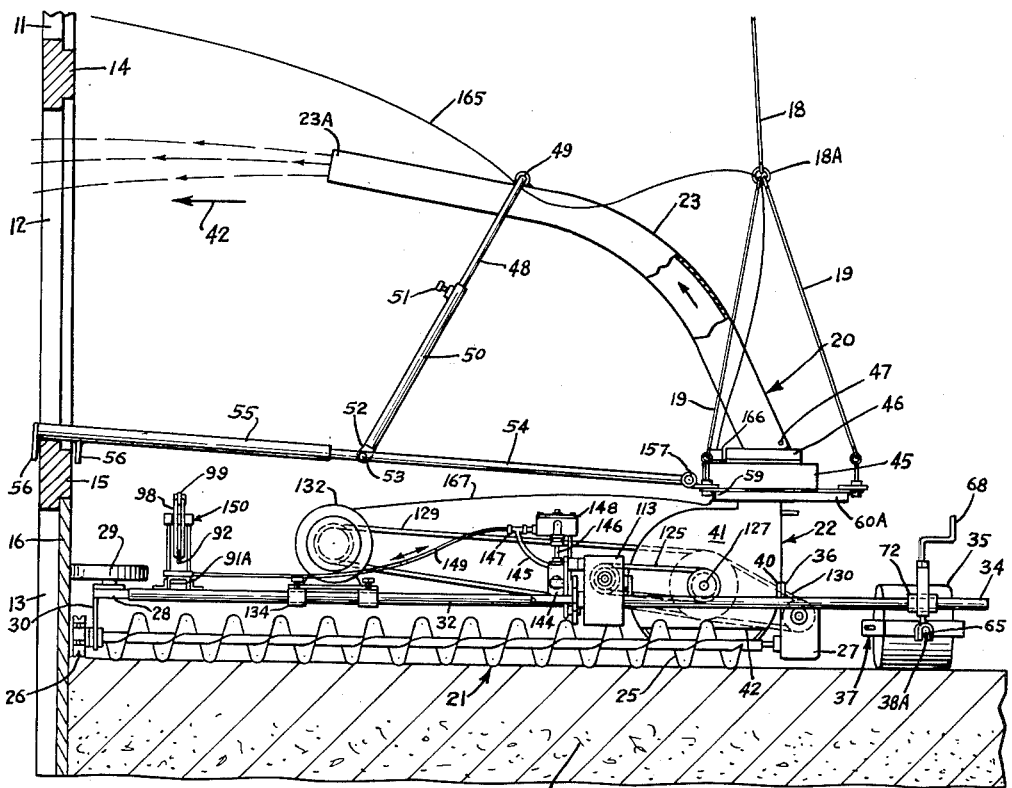
FIGURE 2 is an elevational view of the unloader in the silo of FIGURE 1.

Reference is now made to the drawings for the following description and particularly to FIGURES 1 and 2. In the drawings an upright silo is shown provided with a right circular cylindrical vertical wall having a plurality of conventional apertures 11—13 of rectangular configuration. The apertures are provided with inbetween cross members 14 and 15, cooperating adjacent cross members forming the top and bottom of each rectangular aperture and with corresponding side edges of the aperture formed by the wall 10 forming a door frame or seat for one of a plurality of doors, one of which is shown at 16. The doors and frames are usually in vertical alignment. The silo is usually provided with a suitable chute 17. As stated, the silo is of substantially right circular cylindrical construction, provided of any suitable material, having a suitable cap such as a hemispherical dome, or no cap at all. Apertures 11—13 and corresponding apertures are placed in a vertical line, each aperture being provided with its own removable door, and removable from the interior of the silo as shown by door 16. Chute 17 extends vertically to cover the apertures and terminates in spaced relation to the ground or supporting surface so that the ensilage descending therein may be directed into a wagon, feeding bunk, etc. The silo wall also usually has exterior rungs under the chute for ascension to the last opening for inspection and entry into the interior of the silo when necessary.

The unloader of this invention is designed primarily to be utilized in silos of this cylindrical configuration. However, it is to be understood that it may be used with out-of-round silos, oval silos, asymmetric silos, etc. It may be used with polygonal silos and even rectangular silos providing rounded corners or other means to permit uninterrupted travel of the wall engaging wheels.

While the unloader is intended to be used primarily for the unloading of farm crops or ensilage, it is likewise to be understood that it is suitable for other uses such as unloading walnut shells, woodchips, sawdust and the like. The term "silo," "silo unloader" and "ensilage" contemplates such uses.

As is shown in FIGURE 2, when the ensilage E is stored in the silo, the doors, which may be hinged or removable, but are usually removable, are placed in the corresponding apertures such as 13 and are retained therein by the packed ensilage. The unloader, generally designated 20, comprises a gathering or collecting arm means 21, comprising a rotary auger means as later explained, an elevating or impeller means 22, positioned at substantially the center of the silo, and a discharge means or chute 23. It is suitably suspended from the top of the silo by cable 18 secured to ring 18A to which in turn are secured three cables 19 forming a triangular cable support.

The gathering means comprises a pair of parallel augers 24 and 25 of helical flighting supported upon central shafts and extending radially of the silo, at the outside end of each of which is provided a wall cutter or cleaner 26 comprising a toothed member, the augers at their inner end being supported by and driven through a gear box 27. A cross plate 28 serves as a frame support for the wall engaging wheels 29 which are journalled thereto and outer bearing brackets 30 support outboard bearings for the augers 24 and 25. The cross plate is welded or otherwise suitably secured to the parallel frame members 31 and 32, in this instance tubular.

The augers 24 and 25 are supported by having shafts journalled for rotation at their outer ends in bearings supported by brackets 30 and at their inner end by bearings supported by gear box 27.

The frame members 31 and 32 are provided with inwardly extending ends 33 and 34 (best shown in FIGURES 1 and 2) which are secured to a roller 35 as subsequently explained in greater detail. Gear box 27 is provided with a cross member 36 which extends between the tubular frame members 31 and 32 and is secured to lugs 40 thereon by welding or otherwise. Only one of lugs 40 is shown in FIGURE 2.

The elevating means or central impeller assembly 22 is provided with a scroll housing 41 of the type shown in Patent No. 2,794,560 and reference thereto is made for specific details of the elevating means, as well as the gathering means or collecting assembly 21. Scroll housing 41 has an open bottom and an open side at 42 for the reception of ensilage. Ensilage is thus gathered from the top of the mass E by the gathering means 21, drawn into the center of the silo and conveyed to the elevating means 22 which impels it through the chute or discharge means 23; thence outwardly through the door of the silo as indicated by the arrow 42.

The housing 41 is supported by a cross brace or member 43 bolted to lugs 44 on members 31 and 32, and is also secured to cross member 36.

The exit of housing 41 is positioned interior of and secured to a contact ring assembly 45 which may be of the type shown in Patent No. 2,794,560. On top of the ring assembly 45 is affixed a pair of angle guide members 46 secured in spaced parallel relation and to which the chute 23 is pivoted at 47.

The chute 23 as shown comprises a generally arcuate three-sided conduit having an opening directed toward the surface of the ensilage. It is supported by a rod 48 having a turned end received in a sleeve 49 secured to the chute 23 and provided with a cotter key or otherwise secured for pivotal movement therein. The other end of the rod 48 is received in a sleeve 50, is adjustable therein, and is maintained in adjusted position by a set screw 51. Sleeve 50 is flattened at 52 and pivotally secured at 53 to a torque arm rod 54. Rod 54 is slidably received in a tubular slide 55 which is provided with downwardly depending lugs 56 which are spaced to straddle the cross members as shown for member 15. The torque arm means 54—55 thus serves to support the chute in spaced position both with reference to the torque arm means and to the silo wall.

Note that the chute 23 is thus supported by the torque arm and has an end 23A in spaced relation to the silo wall. The support of the chute from the torque arm means 54—55 is such, as shown in FIGURE 1, that the chute is positioned above and at one side of the torque arm means.

The rod 54 has a turned end 57 forming a pivot in a sleeve 58 supported by braces 59 and 60A from ring assembly 45. A cotter key or other suitable means retains it in this relation. The torque arm means 54—54 serves to prevent the rotation of ring assembly 45 and the chute 23 while the gathering means 21 and elevating means 22 are rotating over the top surface of the ensilage. The braces 59, 60A and 60B are secured together to form a supporting triangle at the apices of which are secured the cables 19.

One end of the silo unloader is supported by the roller or wheel 35, which has a shaft journalled for rotation in a rectangular frame 37.

Figure 5:
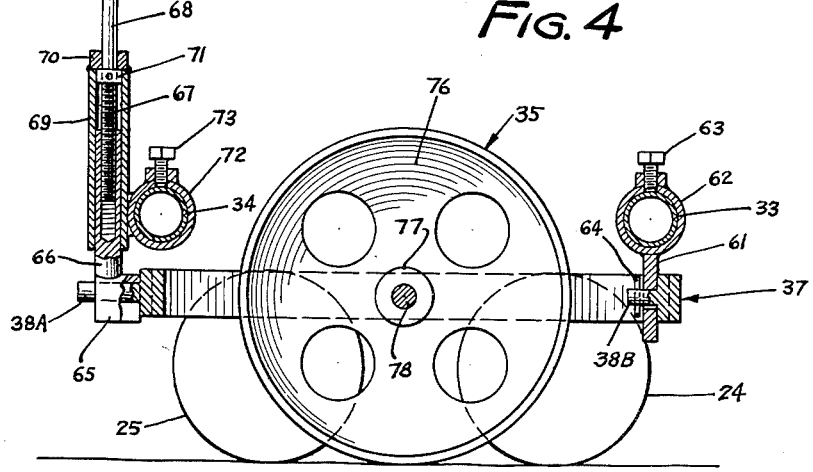
FIGURE 5 is a sectional view taken along the line and in the direction of the arrows 5—5 of FIGURE 1.

Reference is now made to FIGURE 5 for a specific description of the supporting structure for this frame. The frame 37 has the trunnions 38A and 38B secured thereto but each extending in the same direction as shown in FIGURE 5.

Trunnion 38B penetrates an aperture in a depending member or web 61 secured to a sleeve section 62, provided with a set screw 63. Sleeve section 62 encompasses tubular end 33, is adjustable thereon, and is positioned in adjusted position by the set screw. A cotter key 64 serves to retain the trunnion 38B in position but allows pivotal movement thereof.

Trunnion 28A is received in a downwardly turned U member 65 secured to a rod 66 having an interior threading engaged by threaded end 67 of crank 68, rod 66 being received in cylindrical section 69 having a joined cap 70 through which crank 68 penetrates and the underside of which is engaged by collar 71 fixed on crank 68. Cylindrical section 69 is welded or otherwise secured to a sleeve section 72 likewise provided with a set screw 73, similar to screw 63 and section 62. The peripheries of the auger flighting are indicated at 24 and 25 in FIGURE 5 to show the relative position of roller 35.

As illustrated, roller 35 is hollow, provided with spaced central webs 76, a hub 77 extending on each side thereof and a shaft 78 journalled in apertures in frame 37.

An advance wheel 82 is pivoted for rotation about a vertical axis to a guide rod 83 secured to member 32. Tie rods 84 and 85, rod 84 being secured to the rear of housing 41 and rod 85 being secured to lug 44 are each secured thereto at lug 83A serve to stabilize and provide additional support for wheel 82.

The outer or wall engaging end of the gathering means is supported by a pair of trailing wheels 86 and a pair of drive hubs 87A and 87B. Hubs 87A and 87B, wheels 86 and roller 35 serve to support the unloader on the ensilage or supporting surface, hubs 87A and 87B providing the drive for rotating the gathering means and central impeller over the ensilage and within the silo. These elements also provide the parts of the levelling means as is to be explained.

Wheels 86 (as well as wheels 29 and 82) are semi-pneumatic, and are pivoted with reference to a shaft 87 in any suitable fashion.

As shown, shaft 87 is fixedly secured to the cross bar end of T arm 88, the other end 89 of which is bifurcated, the bifurcations being pivoted on pivot pin 90 so that arm 88 normally extends in a direction downwardly and outwardly from the augers as shown in FIGURE 1.

Figure 3:
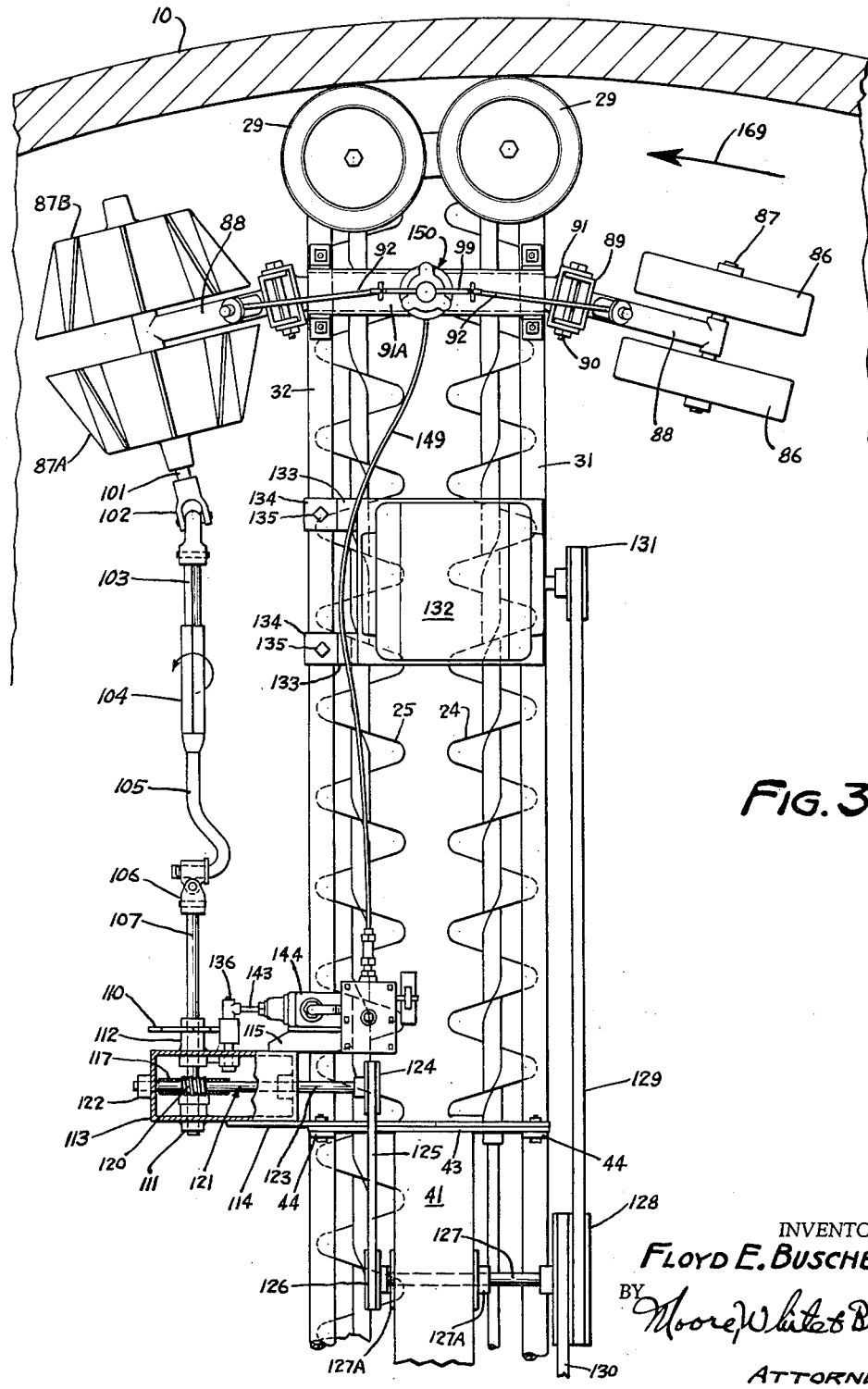
FIGURE 3 is a fragmentary enlarged plan view of the collecting mechanism, drive and levelling mechanism.

A bracket 91 of the configuration shown best in FIGURE 3, providing a cooperating bifurcated end in which the bifurcated end 89 is received, is secured to a channel 91A in turn supported on members 31 and 32. The wheels 86 are thus, in addition to being pivoted on shaft 87, free to float upwardly and downwardly with the arm 88 as it pivots about pin 90 as illustrated by the full and dotted lines in FIGURE 4. A bent actuator bar 92 having a slot 93 at its inner end forming a hook and a cross sleeve section 94 at its outer end pivoted on pin 95, its provided with washers 96 and maintained thereon by a cotter key 97. An elongated steel loop 98 is attached to one end of a piston rod cross bar 99 and positioned in one of the slots 100, oppositely disposed and inwardly directed to form hooks in the ends of bar 99. The other slot 100 receives a similar link 98 connected to a similar arm 92 which is in turn connected to a similar arm 88.

Figure 4:
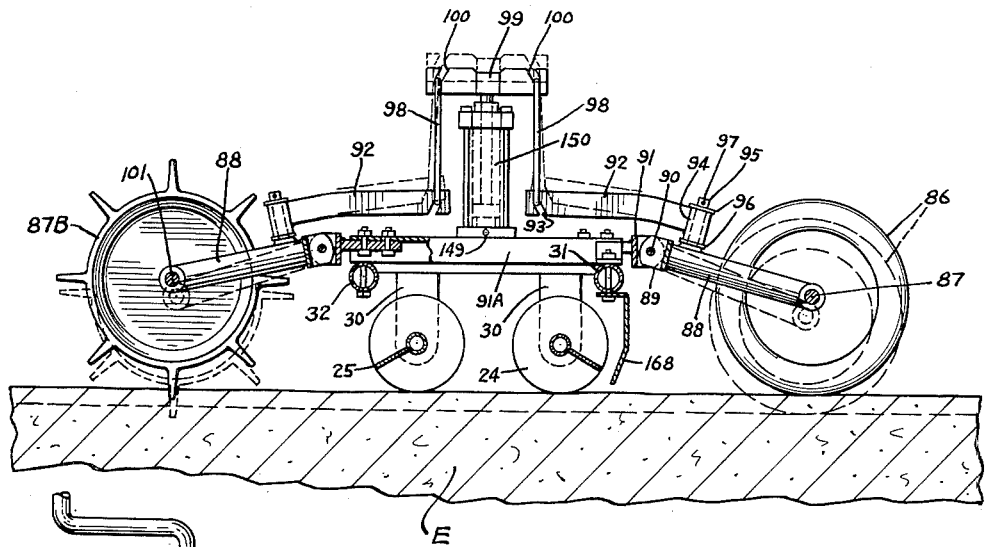
FIGURE 4 is a view taken along the line and in the direction of the arrows 4—4 of FIGURE 1.

However, the leftward arm 88 with reference to FIGURE 4 (and the leading arm 88 with reference to the direction of rotation of the unloader within the silo as shown in FIGURE 1) has journalled therein a shaft 101, one end of which is pinned to hub 87B and the other end of which extends slightly beyond and is pinned to hub 87A as shown in FIGURE 3. The hubs thus may float as wheels 86.

To this extending end of shaft 101 is secured the universal 102 which is also secured to a square rod 103 received in slip fit in a square sleeve 104 which is provided with a bent rod portion 105 secured to a second universal 106 and thence to drive shaft 107.

Figure 8:
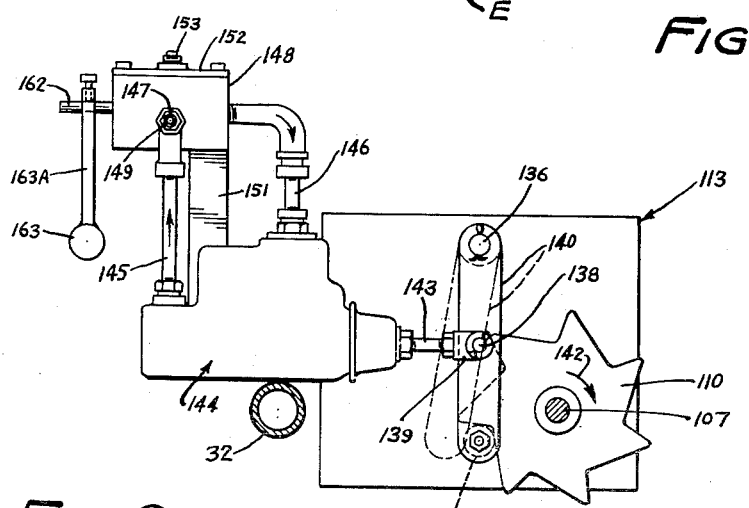
FIGURE 8 is a fragmentary elevational view showing the hydraulic motor and actuator therefor.

Shaft 107 has pinned thereto a ratchet wheel 110 having a notched or stepped periphery as shown in FIGURE 8. Shaft 107 has portions journalled for rotation in bearings 111 and 112 of a second gear box 113. Box 113 is supported from tubular members 31 and 32 by brace 114 which is welded thereto by an extending end. The other side of the second gear box 113 is secured to an angle brace 115 also secured to the cylinder 144 and resting on member 32. Fixed to the end of shaft 107 and interior of housing 113 is a spur gear 117 positioned for cooperation with worm gear 120 secured to worm shaft 121. Shaft 121 is journalled in cooperating bearings 122 in gear box 113 and has an end 123 extending therefrom to which is secured a pulley 124 around which is trained belt 125. Belt 125 is also trained around a corresponding pulley 126 on shaft 127. Shaft 127 is journalled in bearings 127A, extends through scroll housing 41 and has an impeller joined thereto for rotation therein as described in the aforesaid Patent No. 2,794,560. An extending end of shaft 127 is provided with a double pulley 128 around which is trained belts 129 and 130. Belt 129 is passed around pulley 131 of motor 132.

Motor 132 is secured to a pair of cross frame members 133 provided at one end with sleeves 134 circumscribing member 32 and thus positioned for travel inwardly and outwardly with reference to FIGURE 3 for adjusting tension on belt 129. The sleeves may be secured in adjusted position by set screws 135. The other ends of members 133 are provided with similar sleeves or channels either wholly or partially encompassing member 31. Thus the members 133 are mounted for travel on members 31 and 32 for adjustment of the position of the motor 132 and are secured in adjusted position by set screws 135.

Pivoted on pin 136 secured to gear box 113 is a ratchet link 140 having a roller 141 at its depending end. The roller is adapted to be engaged by the periphery of ratchet 110 as it rotates in the direction of the arrow 142 for successively and repeatedly moving it from the full to the dotted line position of FIGURE 8. Pivoted on pin 138 in the middle of link 140 by end fitting 139 is a cylinder rod 143 of cylinder or hydraulic motor 144. Cylinder 144 is of the master hydraulic cylinder type from an automobile and adapted to discharge fluid under pressure through line 145 and to receive returned fluid by gravity flow through line 146 from reservoir 148. Line 145 is provided with a T at 147 from whence fluid may flow to the hydraulic fluid reservoir 148 or through line 149 to hydraulic cylinder or hydraulic motor 150. Cylinder 150 is seated upon channel member 91A as shown in FIGURE 4 and has its rod secured to the center of bar 99 for moving it from the full to the dotted line position of FIGURE 4.

The reservoir 148 is supported by an upright 151 from brace 115. It as a removable cap 152 with a fill plug 153 and a valve seat 154 leading to conduit 155 between T 147 and the reservoir. The valve seat is provided with a needle valve 156 which is engaged by an arm 157 of cam 158, cam 158 being secured by set screw to a shaft 159 rotatable in bearings 160 and 161 of reservoir 148. Shaft 159 has an end 162 extending from the reservoir to which is fixedly secured a weight or gravity operated sensing means 163 normally positioned when the unloader is level as shown in FIGURE 6. When the weight is in the position of FIGURE 6, arm 157 will engage valve 156 to preclude return of fluid from conduit 145 through conduit 155 to the reservoir until the pressure is built up to overcome the weight 163 which is after the piston rod of cylinder 150 is extended.

Thus it will be seen that when valve 156 is closed as the unloader is driven within the silo the constant rotation of ratchet 110 will cause constant reciprocation of link 140 and consequently constant pumping of master cylinder 144. Fluid will thus continuously flow through conduit 145 and to T 147 and from thence through line 149 to cylinder 150 forcing the piston thereof upwardly with reference to FIGURE 4 to force the bar 99 to the dotted line position. However, if the needle valve is open or in a position to permit the flow of fluid through conduit 155 back to reservoir 148, pressure will be relieved from line 149 and consequently the piston of cylinder 150 will not be elevated. The piston and bar 99 will be more or less elevated depending on whether the needle valve is partially open or completely closed which in turn depends on the position of weight 163.

In operation the motor 132 will be adjusted on tubular members 31 and 32 to produce adequate tension on belt 129 and maintained in adjusted position by set screws 135. Electricity will be supplied through a suitable source of electric power via line 165 to juncture box 166 situated on top of contact ring assembly 45 and thence through the ring assembly to line 167 and to motor 132. Belt 129 will drive the double pulley 128 and through belt 130 will drive the augers 24 and 25 through suitable gearing in gear box 27 which may be of the type shown in the aforesaid Patent No. 2,794,560. The augers will thus engage the surface of the ensilage serving to convey it inwardly into the central elevating means 22. The rearmost auger is provided with an auger shield 168 as shown in FIGURE 4 for cooperation therewith. The wall cutters 26 will rotate simultaneously with the augers serving to remove any material positioned immediately adjacent the silo wall.

At the same time, double pulley 128 will drive shaft 127 and the central impeller in the housing 41 to thus gather and elevate ensilage brough in by the augers and eject it through the chute 23 and outwardly from the silo as shown by the arrow 42.

The augers, in addition to being rotated about a horizontal axis to collect ensilage will be rotated about a vertical axis along with the housing 41 in an arcuate direction over the surface of the ensilage, while the assembly 45 and chute 23 will be stationarily positioned by the torque arm means 54—55 and the supporting means for the chute 48, 50. The sleeve 55 will allow reciprocation of rod 54 therein to compensate for an out-of-roundness of the silo wall.

Rotation of shaft 127 will also rotate pulley 126 which in turn through pulley 124, shaft 121, worm 120 and spur gear 117 rotate shaft 107 and thus through the connecting shaft structure and universals rotate the drive hubs 87A and 87B on the surface of the ensilage to pull the unloader in the direction of the arrow 169. Continuous rotation of sprocket 110 will cause continuous movement of link 140 and thus continuous reciprocation of piston rod 143 of cylinder 144, causing fluid under pressure to flow from the master cylinder 144 through conduit 145 to the T 147 and thence through conduits 149 and 155.

The arm 163A is so positioned with respect to cam 157 that when the silo unloader is level the arm is in vertical position as shown in FIGURE 6 allowing slight clearance of needle valve 156 and seat 154 so that fluid may be returned to the reservoir 148 and thus by continuous flow through conduit 146 to the master cylinder. Some pressure will be supplied through conduit 149 to the piston of cylinder 150 to maintain the rod and bar 99 in the position shown in FIGURE 4.

The silo unloader may be initially levelled by the adjustment of crank 68 and the roller 35 will pivot on its trunnions 38A and 38B to compensate for irregularities in the ensilage surface.

If the outboard end of the silo unloader dips as when the wheels 86 and hubs 88 encounter depressions in the ensilage the weight 163 will be swung (more or less) rightwardly by reference to FIGURE 6 opening the needle valve (more or less), allowing release of pressure from conduit 149 and then on the piston of cylinder 150 and allowing bar 99 to drop, thus allowing hubs 87A and 87B and wheels 86 to elevate or to assume the full line position of FIGURE 4.

On the other hand if the end supported by roller 35 or inboard end drops this will cause the weight 163 to swing as far leftwardly as it may go with reference to FIGURE 6 and firmly seat the needle valve 156 to preclude any return of fluid to reservoir 148 until bar 99 has been elevated. Thus, fluid under pressure will be delivered to line 149 to elevate the piston of cylinder 150 moving the bar 99 from the full to the dotted line position of FIGURE 4 and thus depressing the hubs 87A and 87B and the wheels 86 to the dotted line position, thus elevating the outboard end of the unloader to level the same.

In intermediate positions the weight will allow more or less fluid to return to reservoir 148 and thus control the pressure through line 149 from full pressure to low pressure and thus bar 99 will be positioned at intermediate positions.

It will thus be seen that the levelling is automatic and once the piston of cylinder 150 is elevated to a given position, it will remain in that position by balance of fluid pressure and force transmitted from wheels 86 and hubs 87A and 87B until the needle valve is opened wider in which event it will be permitted to descend through overbalance of force from hubs 87A and 87B and wheels 86. Increased pressure in the cylinder 150 by virtue of the closing of the needle valve by movement of the weight 163 in response to depression of the outboard end of the silo unloader will elevate the piston of cylinder 150 by overbalance of fluid pressure.

Reference is now made specifically to FIGURE 9 and the modified form of sensing means or control means for valve 156. In this modification there is shown a second reservoir 170 which is secured to the exterior wall 171 of reservoir 148 which serves as a partition for the combination reservoir and whose walls 172—175 are congruent with the walls 176—178 of reservoir 148. Wall 175 provides a top secured to the reservoir 170 by bolts 176. It is provided with a fill plug 175A.

In this modification weight 178 is not used and there is secured to shaft 162 a sleeve 183 by set screw 179 which has an extending arm 180 joined to a float 181. The float 181 will thus turn the shaft 159 for it will move upwardly or downwardly in the direction of the double arrow 182 in response to the level of the fluid F maintained within the reservoir 170.

Thus, in this modification there is a double or combination reservoir, one containing hydraulic fluid H and one containing any suitable low viscosity fluid F such as water, light oil, etc. to support float 181. As the outboard end of the unloader drops the fluid F will rise under the float 181, raising the float and thus turning shaft 159 to open needle valve 156. As the inboard end of the unloader drops, the function is reversed.

It will thus be seen that in this modification the float is controlled not by direct gravitational effect as the weight 163 is but by the gravitational effect on the fluid F maintaining it level and the tilting of the unloader with respect thereto.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. In a silo unloader the improvement of wheel means positioned on either side thereof and pivotally supported thereto for elevation or depression, hydraulic motor means for controlling the elevation and depression of the same, a source of hydraulic fluid under pressure, valve means for controlling delivery of the same to said hydraulic motor and gravitationally responsive sensing means for opening said valve means as one end of the silo unloader deviates from the horizontal in a given vertical direction.

2. The apparatus of claim 1 in which said gravitationally responsive sensing means comprises a pivoted depending weight.

3. The apparatus of claim 1 in which said gravitationally responsive sensing means comprises a float means.

4. In a silo unloader the improvement of hydraulic means for controlling the levelling of one end thereof and a pendulum weight controlling the actuation of said hydraulic means.

5. In a silo unloader the improvement of a motor, a flexible connection between said motor and shaft of an impeller for receiving and elevating ensilage, means connecting said shaft and a drive means for rotating the silo unloader over the surface of the ensilage, a connection between said drive means and a hydraulic motor means for levelling one end of the unloader, another flexible connection between said impeller shaft and a drive means for driving a helical flight means for gathering ensilage from the surface thereof and for conveying it to said impeller.

6. In a silo unloader, a pair of spaced elongated frame members, a rectangular frame supported for adjustment thereon, means supporting said rectangular frame for pivotal movement about a horizontal axis with respect thereto, one end of said rectangular frame being supported for vertical adjustment with respect to one of said elongated members, and a roller journalled within said rectangular frame for support of said unloader.

7. In a silo unloader having elongated ensilage engaging means for engaging the surface of ensilage and conveying it from an outboard to an inboard end thereof, impeller means for receiving and elevating said ensilage at said inboard end and chute means for guiding the same from the silo, said chute means supported for orbital motion about the center of the silo but rotatively stationary, said elongated means being journalled for rotation about said inboard end, drive means for rotating said elongated means over the surface of the ensilage, the improvement comprising frame means extending from said inboard end and supported from the surface of the ensilage by a roller, said roller being journalled for rotation about a horizontal axis and being positioned for pivotal movement about a second horizontal axis at substantially right angles to said horizontal axis, a vertically adjustable wheel means positioned at the outboard end of said unloader and at one side thereof, said drive means similarly positioned at the other side thereof, means pivotally supporting each of said drive means and wheel means for movement in a vertical plane, a hydraulic cylinder operable from a first position to a second position to depress said wheel means and said drive means simultaneously, means providing a constant source of fluid under pressure, valve means for selectively admitting fluid to said hydraulic cylinder and a depending weight positioned to actuate said valve means for selectively delivering more or less fluid to said cylinder as said outboard end of said silo is respectively depressed or elevated.

8. In a silo unloader having elongated ensilage engaging means for engaging the surface of ensilage and conveying it from an outboard to an inboard end thereof, said elongated means being journalled for rotation about said inboard end, drive means for rotating said elongated means over the surface of the ensilage, the improvement comprising said inboard end being supported from the surface of the ensilage by a roller, said roller being journalled for rotation about a horizontal axis and being positioned for pivotal movement about a second horizontal axis at substantially right angles to said first horizontal axis, a vertically adjustable wheel means positioned at the outboard end of said unloader and at one side thereof, said drive means similarly positioned at the other side thereof, means piovtally supporting each of said drive means and wheel means for movement in a vertical plane, a hydraulic cylinder operable from a first position to a second position to depress said wheel means and said drive means simultaneously, means providing a source of fluid under pressure, valve means for selectively admitting fluid to said hydraulic cylinder, and gravitationally responsive means positioned to actuate said valve means for selectively delivering more or less fluid to said cylinder as said outboard end of said silo is respectively depressed or elevated.

9. In a silo unloader having an inboard end and an outboard end and adapted to rotate over the surface of material being unloaded and about said inboard end, the improvement of wheel means providing three point support therefor, two of said wheel means being positioned one on either side of said outboard end and gravity controlled hydraulic levelling means responsive to the position of said outboard end for elevating or depressing the same.

10. In a silo unloader the improvement of wheel means supporting the outboard end thereof and pivotally supported thereto for elevation or depression, hydraulic motor means for controlling the elevation and depression of the same, a source of hydraulic fluid under pressure, valve means for controlling delivery of the same to said hydraulic motor and gravitationally responsive sensing means for opening said valve means as one end of said silo unloader deviates from the horizontal in a given vertical direction.

11. In a silo unloader, an impeller for receiving and elevating ensilage and means for driving the same, drive means for rotating the silo unloader over the surface of ensilage, hydraulic motor means for levelling one end of the unloader, a helical flight means for gathering ensilage from the surface thereof and for conveying it to said impeller and means for driving the same, and the aforesaid driving means and said hydraulic motor means being interconnected.

12. In a silo unloader having an inboard end and an outboard end and adapted to rotate over the surface of material being unloaded and about said inboard end, the improvement of wheel means providing three point support therefor, two of said wheel means being positioned one on either side of said outboard end, motor means for elevating and depressing the same, and gravity operated control means substantially continuously responsive to the position of said outboard end for controlling the operation of said motor means.

13. The apparatus of claim 12 further characterized in that said silo unloader comprises an elongated ensilage engaging means and said wheel means providing the third point of support is poistioned adjacent the inner end of said unloader.

14. In a silo unloader having ensilage engaging means having an outer end adapted to be positioned adjacent the wall of the silo and an inner end adapted to be positioned adjacent the center of the silo, the improvement of wheel means adjustably supporting an end thereof, motor means connected to said wheel means for substantially continuous vertical control thereof, and gravity operated control means for controlling the operation of said motor means.

References Cited in the file of this patent
UNITED STATES PATENTS

| | | |
|---|---|---|
| 2,651,438 | Peterson | Sept. 8, 1953 |
| 2,663,594 | Dennick | Dec. 22, 1953 |
| 2,671,696 | McLean | Mar. 9, 1954 |
| 2,858,033 | Hofer | Oct. 28, 1958 |